May 25, 1965     I. H. SHER     3,184,937

VOICE CONTROLLED LOCK MECHANISM

Filed March 27, 1963     3 Sheets-Sheet 1

INVENTOR.
IRVING H. SHER

BY Arthur H. Seidel

ATTORNEY

May 25, 1965  I. H. SHER  3,184,937
VOICE CONTROLLED LOCK MECHANISM
Filed March 27, 1963  3 Sheets-Sheet 2
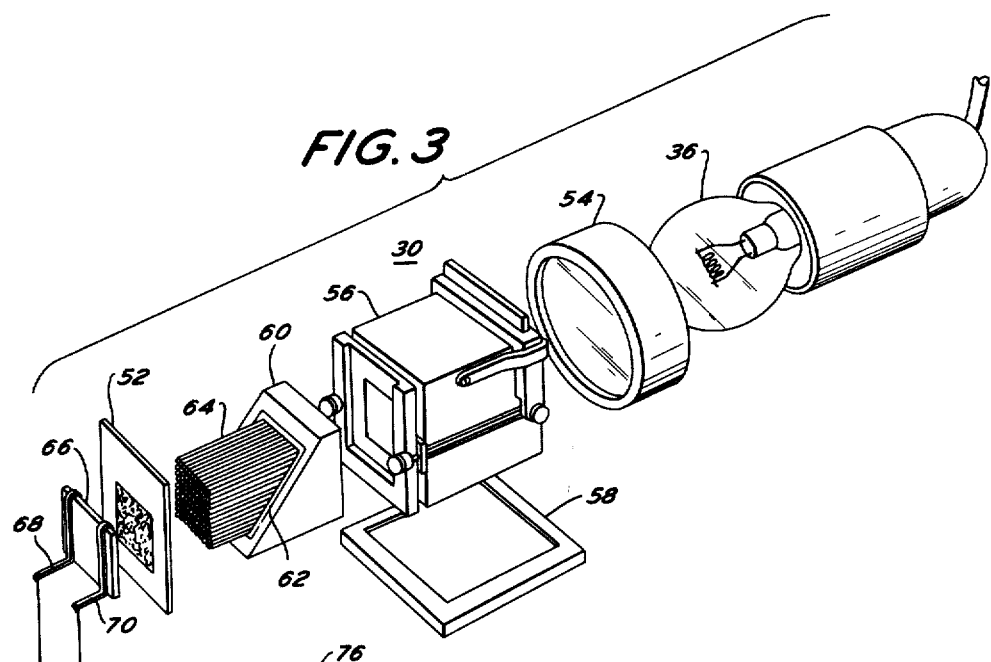
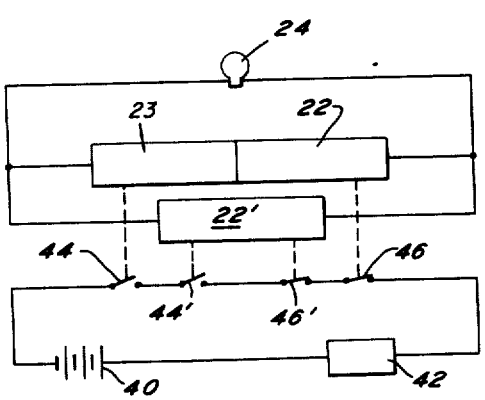
INVENTOR.
IRVING H. SHER
BY Arthur H. Seidel
ATTORNEY

INVENTOR.
IRVING H. SHER

BY *Arthur H. Seidel*

ATTORNEY

United States Patent Office 3,184,937
Patented May 25, 1965

3,184,937
VOICE CONTROLLED LOCK MECHANISM
Irving H. Sher, Philadelphia, Pa., assignor to Institute for Scientific Information, Philadelphia, Pa., a corporation of Pennsylvania
Filed Mar. 27, 1963, Ser. No. 268,294
9 Claims. (Cl. 70—277)

In general, this invention relates to a new and improved voice controlled lock mechanism and, more particularly, to a lock which will be responsive to one or more selected persons' voice and which will obviate the need for coded mechanical devices such as keys.

In order for a voice operated lock to be effective, it must be capable of responding (unlocking) to a specific command spoken by a specific person. This personalized type of lock would bypass the requirement for carrying and using keys.

Recent studies have shown that the audio-spectral characteristics of voices are distinctive and can be used to identify the speaker. Even a good imitation of someone else's voice looks quite different on an oscilloscope when analyzed in accordance with the various frequencies which form the audio signal. This is analogous to the phenomenon where the human eye cannot distinguish between "white" lights composed of completely different combinations taken from the visible electro-magnetic spectrum. So, two voices which sound alike to the human ear can be composed of different combinations of audio frequencies taken from the audible sound spectrum.

Recently, a sound operated fiber-optic "brain cell" has been developed by the Sperry Gyroscope Company division of Sperry Rand Corporation called the Sceptron. A report of the operation of this fiber-optic unit can be found in Electronics World magazine, March 1963, pages 36, 37 and 77. Vibrating optic fibers are specifically designed to respond to the spectrum of audio frequencies.

The present invention utilizes a vibrating optic fiber unit to activate a switch closing a circuit on a servo motor which withdraws the bolt of a lock.

Since, however, vibrating optic fiber units respond on "an at least or more" principle, such locks could be improperly opened by a blast of total sound spectrum. The invention, therefore, utilizes two vibrating fiber-optic units. The first is coded for the particular person saying a particular word. The second units is coded for the negative of the first unit. The switch controlled by the output of this second unit is normally in the closed state and is opened whenever sound other than the code signal is imposed. These two units will respond to the code signal, but not to signals of which the code signal is a part. A blast of total sound spectrum will close the switch associated with the first unit but simultaneously opens the switch associated with the second unit and, therefore, would not open a lock.

Further, the present invention contemplates locks formed with many pairs of vibrating optic fiber units. Thus, one may have a three pair vibrating optic fiber lock which will respond to three different signals or voices so that the lock may be used by more than one person.

Additionally, the lock of the present invention in a preferred embodiment is utilized in combination with the door knob in a manner whereby a button is provided in the door knob to activate the unit, the unit being deactivated when the button is released. Thus, only one hand need be used to open the door.

Therefore, it is the general object of this invention to provide a new and better voice operated lock mechanism.

A further object of this invention is to provide a new and better voice operated lock mechanism which is responsive to a specific word spoken by a specific person.

A still further object is the provision of a new and better voice operated lock mechanism utilizing vibrating optic fibers.

Another object is the provision of a new and better voice operated lock mechanism which is activated only when in use.

Still another object is the provision of a voice operated lock mechanism which can be controlled by a specified number of people.

Other objects will appear hereinafter.

For the purpose of illustrating the invention, there are shown in the drawings forms which are presently preferred; it being understood, however, that this invention is not limited to the precise arrangements and instrumentalities shown.

FIGURE 3 is an exploded view of a Sceptron sound operated fiber-optic unit and a threshold circuit therefor.

FIGURE 11 is a schematic diagram of the unit shown in FIGURE 2 utilized in series with other units so that more than one person are needed to open a given lock.

Figure 1:
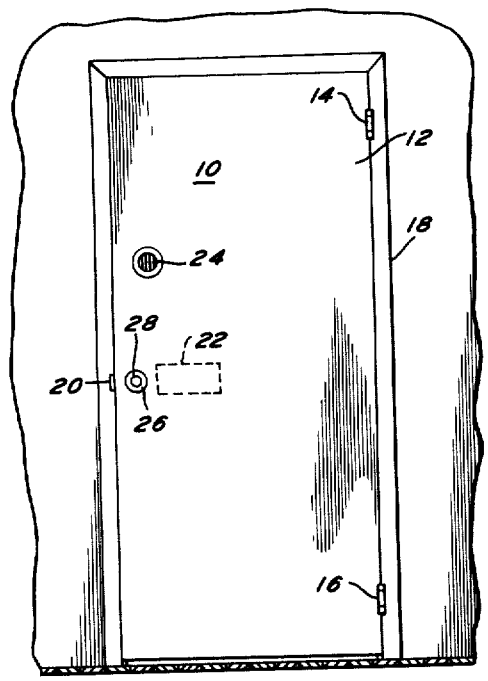
FIGURE 1 is a front plan view of a door incorporating the lock of the present invention.

In FIGURE 1, there is shown the voice control lock mechanism of the present invention generally designated by the numeral 10.

The mechanism 10 includes a door 12 mounted through hinges 14 and 16 to a door frame 18. It will be understood that the hinges 14 and 16 could be utilized as electrical connectors for connecting the apparatus within the door 10 to the electrical wiring system of the building in which the door is mounted.

The door 12 has a standard spring-biased bolt-type lock 20 adapted to cooperate with a suitable recess in the frame 18 to prevent the opening of the door 12.

In accordance with the present invention, the apparatus 10 includes a pair of fiber-optic sound operated signal analyzing devices generally designated by the numerals 22 and 23 which are operative to control the lock 20 in a manner to be shown below. The input to the analyzing devices 22 and 23 is achieved through a microphone 24 mounted on the door 12.

The door 12 further has a doorknob 26 in the center of which is a push button 28. The push button 28 is utilized to apply electric power to the microphone 24 and analyzing device 22.

The analyzing devices 22 and 23 consist of two fiber-optic pattern recognizers 30 and 32 which will be more fully described with reference to FIGURES 3–9. The analyzing devices 22 and 23 are energized by a battery 34 which supplies electric power to two incandescent lamps 36 and 38 associated with the pattern recognizers 30 and 32 respectively. The battery 34 is in series with the push button 28 so that only upon pressing of the push button 28 will the lights 36 and 38 be turned on. Further, the battery 34 energizes the microphone 24. Although a battery 34 is shown which would be mounted in the door 12, it is easily understood that as previously discussed, the apparatus of the present invention could be operated on alternating current from normal building wiring.

The basic components of the sound operated fiber-optic pattern recognizer 30 are shown in FIGURE 3. The device 30 consists of the incandescent lamp 36 which is adjacent a suitable diffuser and lens 54 so as to achieve even distribution of light to the basic element of the unit 30, the fiber-optic array 60. The incandescent lamp 36 and the diffuser 54 are placed in a light sealed housing 56 on top of a piezoceramic driver 58.

The fiber-optic array 60 is the basic element of the system. It is an open bundle of tiny quartz fibers 64, all held at one end by an inclined base 62. All of the fibers 64 are approximately the same diameter, but their free lengths vary in accordance with their position on the inclined surface 62. Thus, each is a tiny cantilever beam and will vibrate in its own fashion whenever it is mechanically excited at its natural frequency. There is sufficient space around each fiber so that it can vibrate in any direction without striking other fibers. A fiber array containing 700 fibers would take up only one-quarter cubic inch. In fact, with better techniques, the fiber array can be kept to an even smaller size.

The fiber array, of course, requires a source of mechanical excitation. The piezoceramic driver 58 provides this by converting electrical signals from the microphone 24 into proportional mechanical motion. The driver 58 has been shown as a piezoelectric device but it could be electromagnetic such as an ordinary loudspeaker. The driver shakes the fiber array to transmit an audio signal. In order to detect the pattern of fiber motion, the incandescent lamp 36 is utilized to transmit light through the fibers onto a photocell 66 which is part of a sensing means. A photographic plate may be placed between the fibers 64 and the photocell 66. This will give a negative picture of the light pattern for the fibers 64. Each fiber that vibrates will leave a black line on the negative picture taken on the photographic plate, and those fibers that do not move will leave a small spot corresponding to their stationary or static position. Everywhere else, the photographic plate will be transparent. When developed, this plate acts as a mask which may be utilized as a memory for the unit in which it is placed, and it will be mounted between the fiber array 64 and the photocell 66 as composite mask 52 shown in FIGURE 3.

Figure 4:
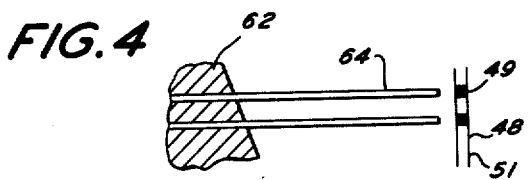
FIGURE 4 shows two of the fibers of the Sceptron unit of FIGURE 3 in the at rest stage and an exposed mask adjacent thereto.
Figure 7:
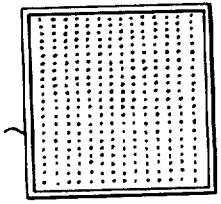
FIGURES 7, 8 and 9 show the developed coded masks for FIGURES 4, 5 and 6 respectively.
Figure 5:
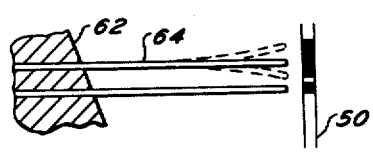
FIGURE 5 shows the array of FIGURE 4 with an exposed mask which is rejection coded.
Figure 6:
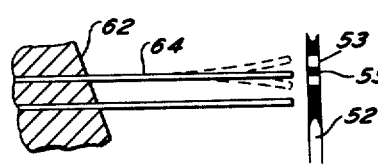
FIGURE 6 shows the array of FIGURE 5 with an exposed mask acceptance coded.
Figure 9:
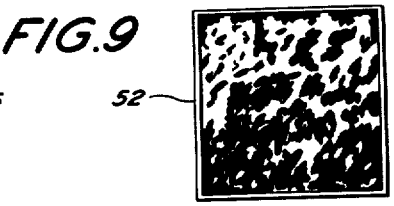

FIGURES 4–9 show how signal recognition is achieved. In FIGURE 4, there is shown the method of producing a static mask 48 shown in FIGURE 7. In FIGURE 5, there is shown the production of a rejection mask 50 shown in FIGURE 8. In FIGURE 6, there is shown the production of an acceptance mask 52 shown in FIGURE 9.

These masks are made by exposing them to the pattern of fiber motion during the time that a signal is on. Thereafter the plate is developed and placed back in its original position.

In FIGURE 4, the static mask 48 is formed by exposing the photographic plate to the fiber array 64 at rest. This produces spaced exposed dots 49, while leaving the remaining area 51 unexposed. If such a plate 48 was developed and placed between the fiber array 64 and the photocell 66, in the absence of any signal, the photocell would be dark since each fiber light spot would be blocked by a black spot 49 on the mask 48. When a signal is received, the fibers 64 will again vibrate in some pattern characteristic of that signal. If the mask 48 was in front of the fiber array 64, a signal would have been received on the photocell 66.

Figure 8:

In FIGURE 5, a rejection mask 50 is shown. The rejection mask is intended to block the desired signal and the zero signal. Thus, the light from the fibers 64 creates a black portion of the mask 50 as shown in FIGURE 8.

In FIGURE 6, an acceptance mask 52 is shown which is composed of the negative from the zero or resting state of the fibers plus the positive from the code activated or desired signal state. Thus, the acceptance mask 52 can be utilized to recognize a coded signal as this mask produces a transparent portion 53 for the desired signal on the mask 52 and a black portion 55 for all lesser signals.

In producing an acceptance mask 52, it is simpler to merely take a positive of the mask 50 and place it in series with the mask 48. Such a mask would be mask 57 in series with mask 48 shown in FIGURE 2.

The mask 52 being a negative of the resting state of the fiber array 64 plus a positive of the code activated state will transmit maximum light to the photocell 66 if the desired signal is received in the microphone 24 and transmitted to piezoelectric crystal 58.

As shown in FIGURE 3, the photocell 66 is connected through wires 68 and 70 to a Zener diode 72 in series with a timing relay 74. The Zener diode 72 is merely shown as one example of a threshold device which could be utilized with the photocell 66. Whenever the photocell has the maximum light impinging thereon through its associated masks, a maximum voltage signal will be produced sufficient to trigger the Zener diode or other threshold device so as to activate the timing relay 74 to close its contacts 46. The threshold unit and timing relay 72 and 74 have been shown in block form as an actuator 76 which forms part of the sensing means.

Thus, the sound operated fiber-optic pattern recognizer 30 will be actuated by the coded signals if spoken into the microphone 24. However, if a lock were operated by the control mechanism 76, it could be improperly opened by a blast of total sound spectrum. The present invention, therefore, contemplates utilizing two vibrating fiber-optic units. The second of the sound operated fiber-optic pattern recognizers 32 contains the mask 50 of the negative taken during the code activated state. The vibrating fiber-optic unit 32 is operatively connected by means of a photocell to a control 78 exactly similar to the control 76. This control 78 opens a normally closed switch 44 whenever sounds other than the code signal are imposed of sufficient intensity to assume that a blast of total sound spectrum has been received.

The switch 46 is normally open and in series with the normally closed switch 44 in a series circuit including battery 40 and the control 42 for a servomotor which would withdraw the bolt of the lock 20 in a standard manner.

The system will respond to the code signal, but not to greater signals of which the code signal is a part due to the negative mask 50. A blast of total sound spectrum will merely close switch 46 but simultaneously open switch 44 and, therefore, not open the lock 20.

The timing relay 74 assures that the lock will remain open for a predetermined period of time after the code signal has been spoken into the microphone 24. The time delay of this relay 74 can be extended for other uses of the voice operated lock of the present invention.

Figure 2:
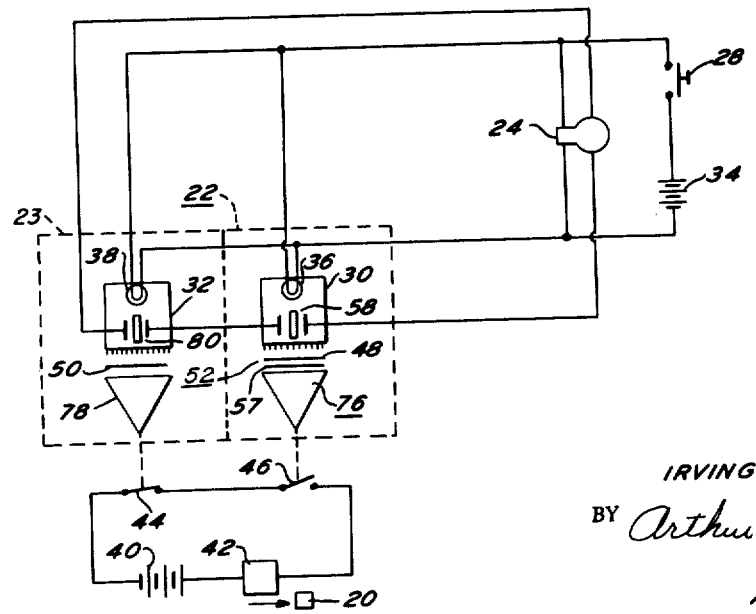
FIGURE 2 is a schematic diagram of the electric circuit for the voice operated lock of the present invention.
Figure 10:
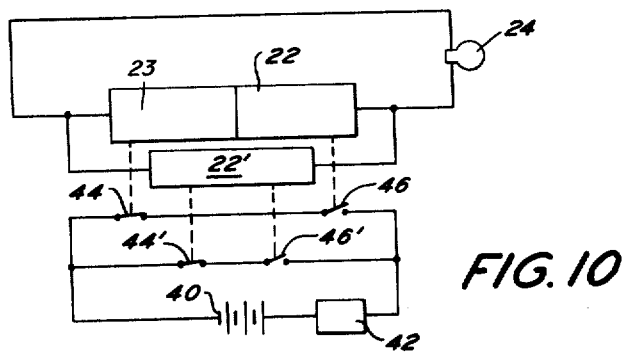
FIGURE 10 is a schematic diagram of the unit shown in FIGURE 2 utilized in parallel with other units so that more than one person can open a given lock.

In FIGURE 10, there is shown a second embodiment of the present invention in which in addition to analyzing devices 22 and 23 a second pair of analyzing devices shown schematically as voice reader 22' has been provided operative from the microphone 24 which are exactly similar to the analyzing devices 22 and 23 discussed in FIGURE 2 except that these analyzing devices 22' are coded for a second person's voice. Analyzing devices 22' control a normally closed switch 44' and a normally open switch 46' similar to the switches 44 and 46 respectively. Switch contacts 44' and 46' are in series with each other and in parallel with contacts 44 and 46 so that operation of either the unit 22, 23 or the unit 22' will actuate the lock release servo control 42. The systems may be expanded to a three or more person lock which will respond to three different signals or voices so that the lock may, when desired, be used by more than one person.

FIGURE 11 shows the same components as the unit in FIGURE 10 except that the switches 44, 46, 44' and 46' are now in series circuit relation so that the lock servo control mechanism 42 will not be operative unless two signals are received. These signals must be given during a predetermined period of time in accordance with the time delay of the timers 74. With these two units in series, the lock will not be opened unless more than one person is present.

The systems presented have only small intermittent power requirements. These can be derived from house electrical lines and/or from batteries, as illustrated. Six batteries may be utilized in place of the two batteries 34 and 40 shown in the drawings. The system can also operate normally from electrical lines with an optional battery feature for emergencies.

The system does not draw any current except for the brief intervals when the lock is actually being opened. This is accomplished by utilizing the button 28 to connect the power supply to the microphone and to the light sources which shine on the optic fibers. In this anticipatory state, utterance of the acceptable code signal or signals sets the fibers vibrating and closes the switch or switches 46 and/or 46′.

By utilizing the button in the doorknob, only one hand need be utilized in opening a door. If the button is not placed in the doorknob, it would be necessary to construct a time delay in the button circuit so that once activated, the system would continue to be energized until the user had time to reach for the door and open it.

The term "lock" is used in its broadest sense and refers to the starting up of a machine otherwise deenergized, activation of dormant electronic apparatus, and any other starting system which requires the security of a highly discriminatory voice controlled actuator to start an operation or, as shown, to open a door. The achievement of a high specificity of sound response by utilizing the paired vibrating fiber-optic units insures proper application to the locking and unlocking mechanisms.

The present invention may be embodied in other specific forms without departing from the spirit or essential attributes thereof and, accordingly, reference should be made to the appended claims, rather than to the foregoing specification as indicating the scope of the invention.

I claim:

1. A voice controlled lock mechanism comprising audio spectral analyzing means, pickup means for transmitting audio signals to said audio spectral analyzing means, said audio spectral analyzing means being coded to respond to a specific spectrum of audio frequencies from said pickup means, sensing means, said sensing means being operative from said audio spectral analyzing means upon receipt of the predetermined spectrum of audio frequencies from said pickup means, a lock mechanism, said sensing means being operative to control said lock mechanism in accordance with the output of said audio spectral analyzing means.

2. The voice controlled lock mechanism of claim 1 including a second audio spectral analyzing means connected to said pickup means, second sensing means connected to said second audio spectral analyzing means, said second audio spectral analyzing means being negatively coded with respect to said specific spectrum of audio frequencies, said second sensing means being operative when a signal other than said predetermined spectrum of audio frequencies has been received by said second audio spectral analyzing means to prevent the operation of said lock mechanism by said first-mentioned sensing means.

3. The voice controlled lock mechanism of claim 2 wherein said first-mentioned and second sensing means include threshold devices, said threshold devices preventing operation of said sensing means until a predetermined signal is received from said first-mentioned and second audio spectral analyzing means respectively.

4. The voice controlled lock mechanism of claim 3 including time delay means associated with each of said first-mentioned and second sensing means, said time delay means being operative from said threshold devices to actuate said lock mechanism for a predetermined period of time.

5. The voice controlled lock mechanism of claim 2 including a second set of first-mentioned and second audio spectral analyzing means and sensing means, said pickup means being operative to energize said first and second sets, either of said first and second sets being operative to control said lock mechanism.

6. The voice controlled lock mechanism of claim 2 including a second set of first-mentioned and second audio spectral analyzing means and sensing means, said first and second sets being operative from said pickup means, said first and second sets being only cumulatively operative to control said lock mechanism.

7. The voice controlled lock mechanism of claim 1, a door, said door being adapted to be mounted on a door frame for sealing an enclosure, said lock mechanism, audio spectral analyzing means, pickup means and sensing means being mounted on said door, a doorknob on said door for opening and closing said door, a push button mounted in said doorknob, electrical supply means for supplying electric power to said audio spectral analyzing means and pickup means, said push button being operative to connect and disconnect said electrical supply means from said audio spectral analyzing means and pickup means.

8. The voice controlled lock mechanism of claim 1 wherein said audio spectral analyzing means includes a plurality of light transmitting optic fibers, a base, said optic fibers being cantilevered from said base, said base being contoured so that the fibers are of various lengths and have various natural frequencies, light excitation means for providing a light signal to the end of said fibers fixed in said base, a coded mask adjacent the free end of said fibers, said coded mask being coded to pass only the light from fibers excited by a specified spectrum of audio frequencies.

9. The voice controlled lock mechanism of claim 8 including a second audio spectral analyzing means similar to said first-mentioned audio spectral analyzing means, said second audio spectral analyzing means having a coded mask which is a negative of said first-mentioned coded mask, second sensing means similar to said first-mentioned sensing means, said second audio spectral analyzing means being connected to said pickup means, said second sensing means being operative to prevent control of said lock mechanism by said first sensing means upon receipt of a signal from said second audio spectral analyzing means.

References Cited by the Examiner

UNITED STATES PATENTS

| 2,008,150 | 7/35 | Nelson | 70—277 |
| 2,936,607 | 5/60 | Nielsen | 70—277 |
| 3,093,994 | 6/63 | Richard | 70—382 X |

ALBERT H. KAMPE, *Primary Examiner.*